United States Patent
de Sio

[15] 3,702,895
[45] Nov. 14, 1972

[54] CABLE TERMINATOR WITH DIELECTRIC

[72] Inventor: Frederick Carl de Sio, Harrisburg, Pa.

[73] Assignee: AMP Incorporated, Harrisburg, Pa.

[22] Filed: March 10, 1971

[21] Appl. No.: 122,951

[52] U.S. Cl. .................................174/19, 174/73 R
[51] Int. Cl. ........................H02g 15/22, H02g 15/04
[58] Field of Search.....174/12 BH, 14 BH, 19, 20, 73 R, 174/75 R, 75 D, 77 R, 78, 80

[56] References Cited

UNITED STATES PATENTS

| | | | |
|---|---|---|---|
| 1,878,016 | 9/1932 | Steinmayer | 174/19 |
| 1,950,608 | 3/1934 | Hanson | 174/75 R X |
| 2,748,184 | 5/1956 | Nicholas | 174/19 |
| 3,317,654 | 5/1967 | Yonkers | 174/73 R |
| 3,322,883 | 5/1967 | Lusk | 174/19 X |
| 3,439,110 | 4/1969 | Lusk | 174/19 X |
| 3,445,580 | 5/1969 | Lusk | 174/12 |

Primary Examiner—Laramie E. Askin
Attorney—William J. Keating, Ronald D. Grefe, Gerald K. Kita, Frederick W. Raring, Jay L. Seitchik, John R. Flanagan and Allan B. Osborne

[57] ABSTRACT

A cable terminator wherein an insulation housing is received in a conducting shield. A multiple loop spring provides a plurality of electrical conducting paths in contact with and extending between the shield and the semi-conductive jacket of a high voltage cable. The housing may be partially filled with a flowable dielectric sealably retained within the housing by a dielectric absorbing seal.

2 Claims, 3 Drawing Figures

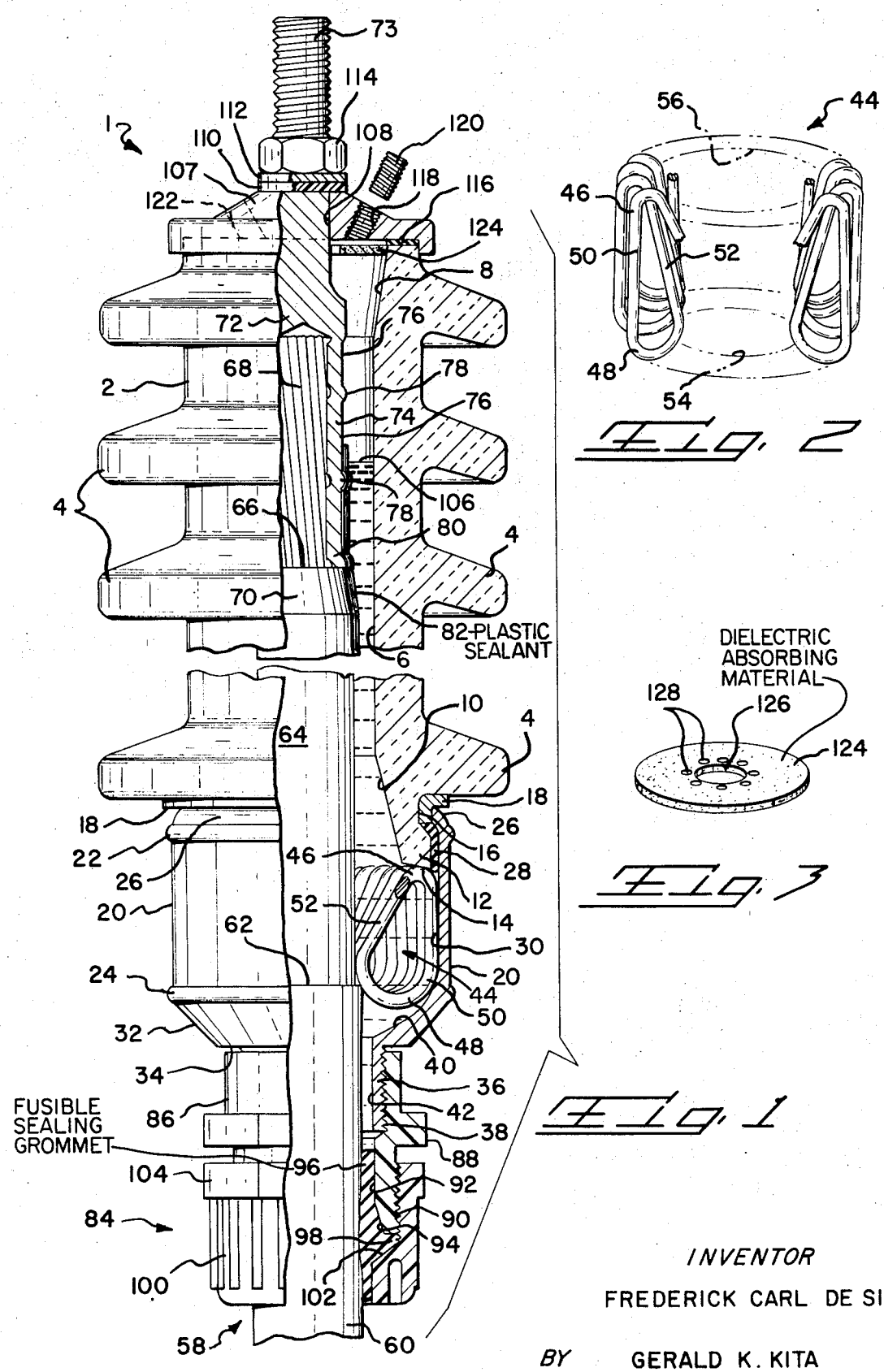

CABLE TERMINATOR WITH DIELECTRIC

The present invention relates generally to a cable terminator, and more specifically to a terminator providing mechanical and voltage stress relief for high voltage cable. According to the present invention, an electrically insulating and voltage stress relieving termination for high voltage cable includes an elongated ceramic housing partially filled with a dielectric which may advantageously be of a flowable medium to fill voids and other imperfections in the dielectric insulation layer covering the cable. A generally cylindrical external conducting shield encircles the cable and receives the end of the insulation housing therein. Voltage stress relief as well as mechanical stress relief for the cable is provided by a continuous multi-loop resilient spring of annular configuration resiliently engaged radially between the cable and the end of the insulating housing. The loops of the spring provide a plurality of electrically conducting paths from the cable shielding jacket to the cylindrical shield. A particular advantage residing in the present invention permits assembly of the terminator without a need for positively attaching the spring to the conducting shield. A further feature of the invention includes at least partially filling the insulation housing with a flowable dielectric substance which fills the voids and other imperfections of the cable insulation in order to improve the desirable insulation properties thereof. The internal configuration of the terminator according to the present invention prevents entrapment of evolved gases and enhances escapement thereof, further contributing to the insulation properties of the completed termination with a high voltage cable. The spring supports the cable internally of the insulation housing while at the same time providing both mechanical and electrical stress relief. The external conducting shield is received in a covering and sealing mechanism containing a compressible resilient grommet which distributes the mechanical gripping and sealing stresses along a substantial length of the cable semi-conductive shield jacket. The grommet may be fabricated from a fusible material which becomes bonded to the cable semi-conductive shield layer upon heat cycling normally experienced during operation. The terminal end portion of the cable is provided with an electrical connector attached to a sealing cap for the insulation housing. A wafer of dielectric absorbing material is provided internally of the insulation housing to prevent leaking of the flowable dielectric when the cable terminator is tipped. In the usual application, a sealant is provided to prevent leakage of the flowable dielectric between the strands of the cable and internally of the cable insulation.

It is therefore an object of the present invention to provide a cable terminator with mechanical and electrical stress relief structure for high voltage cable.

Another object of the present invention is to provide a high voltage cable terminator at least partially filled with a dielectric medium providing electrical insulation for the cable.

Another object of the present invention is to provide a terminator for high voltage cable providing a plurality of electrically conducting paths over a relatively short distance between a high voltage cable semi-conductive shielding jacket and a conducting shield portion of the terminator.

Yet another object of the present invention is to provide a continuous multiple loop spring which mechanically supports and provides mechanical and electrical stress relief for a high voltage cable with a terminator therefor without a need for positively securing the spring to either the cable or the terminator.

A further object of the present invention is to provide a terminator for high voltage cable provided with a flowable dielectric and a dielectric absorbing seal for preventing leakage of the dielectric from the terminator.

A further object of the present invention is to provide a cable terminator, the internal configuration of which prevents entrapment of and enhances escapement of evolved gases.

Yet a further object of the present invention is to provide a cable terminator for high voltage cable utilizing a sealing grommet for distributing mechanical stress along the surface of the cable semi-conductive shield jacket.

Yet a further object of the present invention is to provide a cable terminator having a flowable dielectric and a seal for preventing flow of the dielectric along the strands of the cable.

Other objects and many attendant advantages of the present invention will become apparent upon perusal of the following detailed description taken in conjunction with the accompanying drawing, wherein:

FIG. 1 is a fragmentary elevation of a preferred embodiment according to the present invention with parts partially broken away and with parts partially in section to illustrate the structural details thereof;

FIG. 2 is an enlarged fragmentary perspective of a mechanical and electrical stress relief structure according to the present invention in the form of a continuous multiple loop spring of annular configuration; and FIG. 3 is a perspective of a generally circular wafer of a dielectric absorbing seal preventing leakage of a flowable dielectric from the termination according to the present invention.

With more particular reference to FIG. 1 of the drawing, there is shown generally at 1 a terminator according to the present invention. The terminator is provided with a generally cylindrical elongated housing 2 of a suitable dielectric material such as ceramic, and is further provided with a plurality of generally annular, longitudinally spaced, outwardly projecting skirts 4. The housing 2 is provided with an elongated generally cylindrical bore 6 communicating at one end of the housing with an outwardly flared counterbore 8. The remaining end of the bore 6 communicates with another outwardly flared counterbore 10. A terminal end 12 of the housing 2 is provided with an internal chamber 14 for a purpose to be described hereinafter. Between the terminal end 12 and one of the adjacent skirts 4, is provided a generally annular externally surrounding recess 16. A generally annular metal collar 18 is received within the annular recess 16. The collar 18 is generally of inverted L-shaped configuration and in registration within the annular recess 16 and the adjacent skirt 4. The terminal end portion 12 is received internally of an encircling generally cylindrical electrically conducting shield 20. The shield 20 is provided with a pair of spaced annular encircling integral beads 22 and 24 and is fabricated preferably from a metal such as aluminum. One terminal end portion 26 of the shield adjacent to the bead 22 is received in registration against the annular metal collar 18. As shown in FIG. 1, the end portion 26 additionally is deformed to provide a radially inwardly projecting lip in abutting registration against the annular collar 18. The shield 20 is thereby retained in assembly over the terminal end portion 12 of the housing 2 with the annular collar 18 preventing stress concentration at the location of attachment between the housing 2 and the shield 20. A generally annular seal 28 is interposed radially between the terminal end portion 12 of the housing 2 and the inner diametrical sidewall 30 of the shield 20. For example, the seal 28 may be retained in place by compression. However, it is advantageous that the sealant be selected of material having adhesive properties to prevent inadvertant removal thereof. As shown in FIG. 1, with the seal 28 in compression as described, a portion thereof is extruded partially into the recess 16 to sealably engage against the annular collar 18.

Yet with reference to FIG. 1, the exterior of the cylindrical shield 20 adjacent to the bead 24 is generally tapered at 32 and terminates in a generally inverted generally annular shoulder 34. Generally integral with the taper sidewall 32 is a reduced diameter cylindrical end portion 36 which outwardly projects from the shoulder 34 and is provided with external threads as shown at 38. The inner diametrical sidewall 30 of the shield 20 is contiguous with a radially inwardly directed arcuate sidewall 40 internally of the tapered sidewall 32. The arcuate internal sidewall 40 terminates in a reduced diameter cylindrical sidewall 42 which is internally of the threaded portion 38.

With more particular reference to FIGS. 1 and 2, a mechanical and electrical stress relief feature according to the present invention will be described in greater detail. Shown generally at 44 in both figures is a continuous multiple loop spring generally of annular configuration. More specifically, the spring 44 is formed by a continuous helically coiled wire. Each loop of the continuous coiled spring is characterized with a reduced arcuate bight 46 and an enlarged arcuate bight 48 connected by a generally vertical portion 50 of each loop. The enlarged arcuate bight is contiguously connected to another reduced arcuate bight of an adjacent loop by a generally vertically inclined portion 52. Looped coiling of the wire is continued so as to provide a plurality of continuous loops arranged into an annular configuration for the spring 44, with the enlarged bight portions 48 defining radially therebetween a reduced diameter opening indicated generally by the phantom line 54. Additionally, the reduced arcuate bight portions together define radially therebetween an enlarged diameter opening indicated by the phantom line 56. Thus as shown in FIG. 2, the generally annular configuration of the spring 44 is characterized with the generally vertically oriented spring portions 50 being generally radially outward of the vertically inclined portions 52. Thus as shown in FIG. 1, the spring 44 is received internally of the cylindrical metal shield 20 with each elongated spring portion 50 in elongated longitudinal engagement against the inner diametrical sidewall 30. The reduced arcuate loop portion 46 of each loop is adjacent to the chamfered end 14 of the ceramic housing 2, and the enlarged arcuate loop portion 48 is adjacent to the radially inward arcuate sidewall 40. The spring 44 is thus freely received within the shield 20.

As shown in FIG. 1, a cable to be terminated is indicated generally at 58. The cable end to be terminated is dressed in such a manner so that an outer semi-conductive shielding layer 60 is trimmed with a terminal end portion 62 exposing a length of underlying dielectric layer 64. The dielectric length 64 is trimmed with a terminal end portion 66 to expose the end portion of a multi-strand high voltage cable to be terminated. The end portion of the dielectric layer 64 is externally tapered as shown at 70 in order to eliminate voltage stress concentrations at the terminal end 66. The end portion 68 of the cable is provided with an electrical connector 72 having an integral sleeve portion 74 receiving the cable end portion 68. The sleeve 74 is connected to the cable end portion 68 a series of spaced compression crimps, two of which are indicated at 76. Typically, a projecting bead 78 is formed between adjacent compression crimps 76. As shown in FIG. 1, the sleeve 74 has its terminal end portion 80 adjacent to the terminal end portion 66 of the dielectric layer 64. Normally, the cable end portion 68 is exposed in the space between the adjacent end portions 66 and 80 and a sealant must be applied to prevent such exposure. Virtually any material capable of forming a sealant may be applied, such as conventional thermo-plastic or heat setting thermo-plastic material or a sealant material which is fusible upon the application of heat. In a preferred embodiment of the invention, such sealant may take the form of several wrapped layers 82 of a sealing tape. Such tape may be of the adhesive type or a heat shrinkable and heat bondable type. Such tape is applied sealingly in covering relationship over the exposed cable end portions 68 and is also overlapped in covering relationship over the end portion 70 of the dielectric 64 and the adjacent end portion 80 of the electrical connector 72.

The procedure of inserting the dressed and terminated cable end portion 58 into the housing 2 will be described in detail. The threaded end portion 73 of the electrical connector 72 is initially inserted through the reduced diameter end portion 36 of the metal shield 20. Insertion of the cable 58 is continued, with the electrical connector 72 and the dielectric 64 successively being received through the opening 54 defined radially between the enlarged arcuate loops of the continuous spring 44. Upon such insertion, the bights 48 will flex resiliently radially outward to allow passage of the connector 72 and the dielectric 64 therebetween. Also during such insertion, the spring will be radially compressed outwardly against the sidewall 30 of the metal shield 20, thereby providing some radial compression inwardly against the cable 58 upon such insertion. Further insertion will cause the threaded end portion 73 of the connector 72 to protrude from the flared counterbore 8 of the ceramic housing 2. Insertion of the cable is completed when the outer conductive shield layer end portion 62 becomes stopped against the enlarged arcuate bights 48 of the spring 44. Such stopping action is communicated to the operator in the form of a sudden increase in the radial inward compression of the spring on the cable 58, indicating that proper insertion of the cable 58 is completed. Such proper insertion can be checked by the operator upon continuing the insertion of the semi-conductive shield layer 60 past the stopped condition internally between the enlarged arcuate bight portions 48 of the spring. As a result, the operator will notice a positive increase in the radial compression on the cable 58, which produces an abrupt increase in frictional forces in opposition to further insertion. Such action notifies the operator that the cable 58 is more than fully inserted. The operator then must partially retract the cable 58 and return it to its stopped condition with the terminal end 62 of the semi-conductive shield layer 60 in registration against the enlarged arcuate bight portions 48. Thus with insertion of the cable completed as shown in FIG. 1, the multiple loops of the spring 44 will be engaged in stopped relationship against the terminal end portion 12 of the ceramic housing 2, the metal shield 20 and the terminal end portion 62 of the semi-conductive shield layer 60. The enlarged bight portions 48 will be retained in partial radial compression between the dielectric layer 64 and the inner diametrical sidewall 30 of the metal shield 20, thereby providing radial mechanical support for the cable 58 internally of the terminator 1. To retain the cable in place, the reduced diameter end portion 36 of the metal housing 20 is provided with a covering and sealing mechanism indicated generally at 84 and comprising an outer generally cylindrical plastic collar 86 one end portion of which is internally threaded to be threadably received over the external threads 38 of the end portion 36. The medial portion of the collar 86 is provided with an enlarged hexagonal radially projecting flange 88 to receive thereover a tightening wrench. The remaining end portion of the collar 86 is externally threaded as shown at 90. The collar 86 is provided therethrough with a longitudinally extending, enlarged diameter aperture 92 communicating with an outwardly flared portion 94. A generally cylindrical elongated grommet 96, encircling the outer semi-conductive shield layer 60 of the cable, is inserted internally of the collar 86 and substantially fills the space between the semi-conductive shield layer 60 and the enlarged diameter aperture 92. The medial portion of the grommet 96 includes an outwardly projecting, generally annular, wedge-shaped portion 98 partially received in the flared portion 94 of the collar. An internally threaded enlarged diameter cylindrical cap 100 is received in encircling relationship over the semi-conductive shield layer 60 and includes a threaded end portion threadably received over the external threaded portion 90 of the collar 86. The cap is further provided with a generally enlarged diameter internal sidewall 102 which forcefully compresses the wedge-shaped portion 98 of the grommet as the cap 100 is threadably secured to the collar. The cap 100 is provided with a radially projecting hexagonal shaped flange 104 to receive thereover a wrench or other suitable tool for threadably securing the cap to the collar. Compression of the cap on the wedge-shaped portion 98 creates both radial and longitudinal compression of the grommet in sealing and encircling relationship over the semi-conductive shield layer 60 of the cable 58. Radial compression on the cable is distributed substantially along the length of the grommet to prevent undesirable stress concentrations. The grommet may be fabricated from a suitable elastomeric sealing material and preferably one which becomes fusible at an elevated temperature.

The cable 58 is thereby retained in proper insertion within the terminator 1. The ceramic insulator 1 may be at least partially filled with a dielectric medium 106. Any suitable solid dielectric or high viscosity dielectric substance may be utilized. However, in a preferred embodiment of the invention, a suitable flowable dielectric proves to be most advantageous. Particularly, suitable dielectric mediums were found to be, a vegetable oil such as caster oil, or a mineral oil or other organic liquids. Leakage of the oil is prevented by the seal 28, the grommet 96 and the sealant 82 which covers the cable end portion 68. To complete the assembly, a covering and sealing structure for the end of the ceramic insulator housing 2 is indicated at 107 is the form of a sealing cap. The cap has a generally central aperture 108 which receives therethrough the threaded end portion 73 of the electrical connector 72. A sealing washer 110 encircles the threaded end portion 73 and is compressed into sealing engagement on the cap 107 by a lock washer 112 and a threaded nut 114 that is threadably driven over the end portion 73. Another moisture seal in the form of an enlarged diameter washer 116 is compressed between the ceramic insulator housing 2 and the cap 107. The housing in thereby sealed from moisture.

In an alternative assembly of the terminator 1, it may be desirable to secure the cap 107 to the electrical connector 72 prior to addition of the dielectric 106. In such case, an orifice 118 is provided through the cap 107. As shown the orifice is internally ribbed to receive an externally ribbed sealing plug 120 which is advantageously resiliently pressed into place to provide a moisture seal for the orifice. An advantageous technique for adding the dielectric 106 includes the use of a collapsible plastic bottle (not shown) with a nozzle tip inserted into the orifice 118. An operator manually squeezes the bottle to collapse it and force the flowable dielectric into the ceramic housing 2. The air internally of the housing which is displaced upon the addition of the dielectric will be received into the bottle to expand it from its collapsed condition. When sufficient amount of oil dielectric is added, the bottle is removed from the orifice and the sealing plug 120 inserted. If desired, a separate orifice shown in phantom line at 122 may be provided to allow escape of air as the dielectric is added. Such additional orifice 122 must be sealed with a plug similar to the plug 120.

As a further feature of the invention preventing leakage of the dielectric 106 upon tipping of the termination 1, reference will be made to FIG. 3, taken in conjunction with FIG. 1. As shown in FIG. 3, a generally circular wafer 124 of dielectric absorbing material is provided with an enlarged central aperture 126 and a plurality of reduced diameter apertures 128 adjacent to the aperture 126. The wafer 124 may be fabricated from a woven or non-woven filamentary or fabric material or of a felt material capable of absorbing the flowable dielectric 106 by capillary action. In use, the wafer 124 is inserted in the flared counterbore 8 of the ceramic insulator housing 2 adjacent to the cap 107. The aperture 126 of the wafer receives therethrough the connector 72. Should the terminator 1 be tipped from a vertical as shown in FIG. 1, the flowable dielectric 106 will flow into the flared counterbore 8 and become at least partially absorbed by the wafer 124. As the dielectric is absorbed, the wafer will radially expand in compression against the encircling housing 2 and prevent leakage of dielectric through the cap 107. The apertures 128 are provided to allow passage of the flowable dielectric therethrough when introduced through the orifice 118. If however the dielectric is added before the cap 107 is assembled, such apertures may be eliminated. Despite the presence of such apertures, the terminator 1 must be tipped to a relatively large angle from the vertical before leakage of the dielectric through the apertures 128 is experienced.

Among advantages resulting from the present invention, the flowable dielectric medium is free to circulate within the terminator 1 to fill voids and surface imperfections of the ceramic housing 2 and the cable dielectric 64, thereby increasing the dielectric properties of the cable itself and eliminating corona. The termination is moisture proof and when partially filled with a flowable dielectric, sufficient space remains to allow for expansion of the flowable dielectric due to thermal cycling. The continuous loop spring 44 mechanically radially supports the dressed cable internally of the terminator 1, the loops forming a plurality of electrical circuit paths extending in directions approximating that of the equivalent potential lines from the semi-conductive shield layer 60 to the metal shield 20. The spring loops are additionally directly connected between the shield layer 60 and the outer shield 20 without a need for positively securing the same. The spring accordingly provides both mechanical stress relief and voltage stress relief. The metal shield 20 extends longitudinally on either side of the spring 44, yet the loops of the spring provide relatively short, directly connected circuit paths in contact with both the semi-conductive shielding layer 60 and the metal housing 20. Upon heat cycling, the grommet 96 will become fused to the surface of the shielding layer 60 to prevent creep in the cable due to mechanical and sealable gripping thereof. The construction of the terminator 1, without inverted horizontal surfaces, prevents entrapment of gases in the dielectric and enables evolved gases to be expelled from the dielectric. More specifically, gases are expelled and allowed to rise vertically through the dielectric medium by passage through the open loops of the spring and along the chamfered surface 14 as well as the surface of the flared counterbore 10. Additionally, the spring is generally arcuate in cross section to prevent the formation of inverted horizontal surfaces tending to impede escapement of evolved gages.

Other modifications and embodiments of the present invention will become apparent to one having ordinary skill in the art without departure from the spirit and scope of the invention as embodied in the appended claims, wherein:

What is claimed is:

1. A cable terminator terminating high voltage cable of the type having an outer semi-conductive shielding layer, an internal conductor and a dielectric layer thereinbetween, the combination comprising:
   a. an elongated housing of an insulating material and having a bore extending therethrough receiving said high voltage cable therein;
   b. an electrical connector positioned in one end of said housing and having a sleeve portion thereon connected to said internal conductor of said high voltage cable;
   c. a cup-shaped shield of conducting material positioned on another end of said housing and having a bore receiving said high voltage cable therethrough;
   d. an annular, helically coiled wire, having a plurality of vertical, generally triangularly shaped loops, freely positioned in said shield and encircling said high voltage cable, said wire being compressibly engaged against said semi-conductive shielding layer of said cable and said shield of conducting material and being operable to relieve mechanical stress exerted on said cable and further operable to transfer electrical force from said semi-conductive shielding layer of said cable to said shield;
   e. an upper sealing cap for sealing an upper end of said housing, said sealing cap having a centrally positioned bore receiving said electrical connector extending therethrough and at least one pluggable orifice communicating with said bore in said housing;
   f. a lower cap secured on a lower end of said housing, said cap having a bore therethrough receiving said high voltage cable therethrough;
   g. sealing means positioned in said bore in said lower cap and sealingly compressed around said high voltage cable passing through said bore of said lower cap; and
   h. a liquid dielectric medium contained in said shield and said bore in said housing and encircling said high voltage cable thereby eliminating corona.

2. A cable terminator terminating electrical cable, which comprises:
   a. an elongated ceramic housing having a bore therethrough;
   b. a conductive shield attached to one end of said housing; said shield having an internal arcuate sidewall therein;
   c. a continuous multiple loop spring of annular configuration freely positioned in said shield adjacent said arcuate sidewall therein, said loops being generally triangular in cross-section and having arcuate top and bottom portions; said spring encircling and engaging said electrical cable;
   d. a lower cap positioned on said conductive shield and covering a lower end of said housing;
   e. sealing means positioned in said cap and sealing a lower end of said housing in cooperation with said lower cap and the electrical cable;
   f. an electrical connector extending into an upper end of said housing, said connector receiving an end of the electrical cable;
   g. an upper sealing cap having a bore therethrough receiving said connector therethrough, said upper sealing cap positioned on an upper end of said housing in sealing relation therewith;
   h. a fluid dielectric medium at least partially filling said bore in said housing; and
   i. an absorbant circular wafer positioned in said bore in said housing adjacent said sealing cap and operable in cooperation with said sealing cap to prevent leakage of said fluid dielectric medium from said bore in said housing.

* * * * *